J. C. SIEGLE.
EVAPORATING DEVICE.
APPLICATION FILED OCT. 23, 1917.

1,285,813.

Patented Nov. 26, 1918.

Witnesses
J. H. Crawford
B. R. W. Buck

Inventor
John C. Siegle,
By Milton Buck
Attorney

UNITED STATES PATENT OFFICE.

JOHN C. SIEGLE, OF LOST SPRINGS, KANSAS.

EVAPORATING DEVICE.

1,285,813. Specification of Letters Patent. Patented Nov. 26, 1918.

Application filed October 23, 1917. Serial No. 198,075.

*To all whom it may concern:*

Be it known that I, JOHN C. SIEGLE, a citizen of the United States, residing at Lost Springs, in the county of Marion and State of Kansas, have invented certain new and useful Improvements in Evaporating Devices, of which the following is a specification.

This invention has relation to evaporating devices, and has for an object to provide a device in the nature of a container in which comminuted food, such as fruit, vegetables or the like may be placed and the container exposed to the sun to dry the food.

Another object of the invention is to provide an evaporator of the character above described, embodying frames hingedly connected for relative movement to permit the same to be opened and the food to be placed, the frames being covered with foraminous material to prevent the entrance of insects or extraneous material.

In addition to the foregoing, this invention comprehends improvements in the details of construction and arrangement of parts, to be hereinafter described and particularly pointed out in the appended claims.

In the accompanying drawings in which similar and corresponding parts are designated by the same characters of reference, throughout the several views in which they appear:

Figure 1:
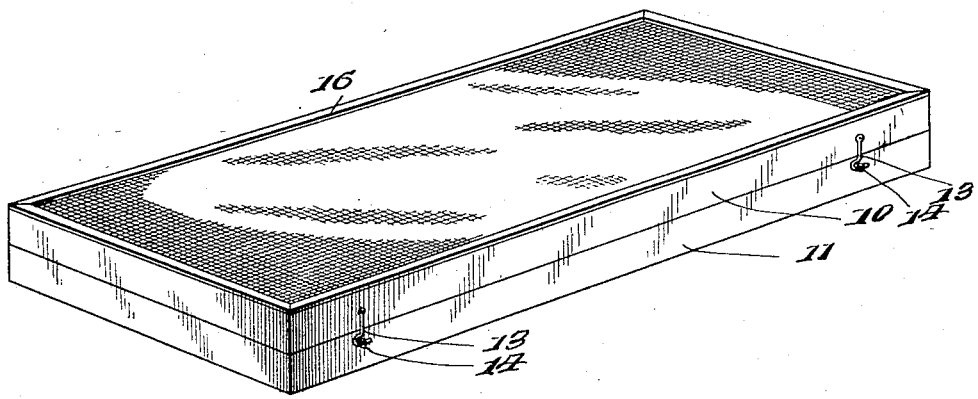
Figure 1 is a view in perspective of an evaporating device, constructed in accordance with my invention.
Figure 2:
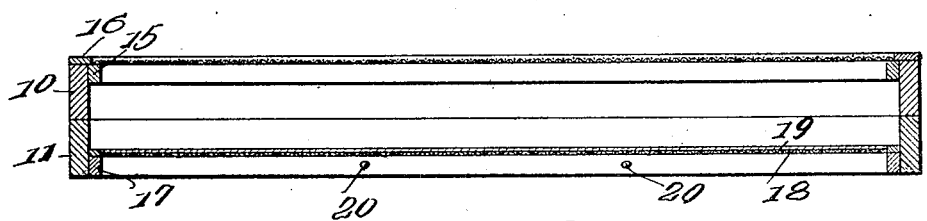
Fig. 2 is a view of the device in longitudinal section.
Figure 3:
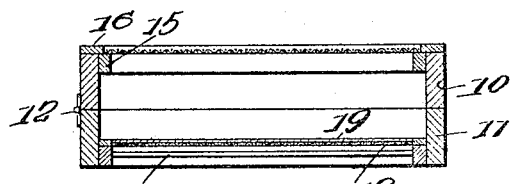
Fig. 3 is a transverse sectional view thereof.

The device comprises in its essentials a pair of open rectangular frames in superposed relation, the upper being indicated at 10 and the lower at 11. Hinges 12 secured to the frames at one of the longitudinal edges thereof serve to secure the frames together and at the same time permit separation thereof. Hooks 13 secured to the free longitudinal edge of the upper frame are adapted for engagement with eyes 14 mounted on the lower frame to secure the same together against separation. The frames are preferably three feet wide and five feet long; and the depth of the container when the frames are in closed relation should be about four inches. Obviously, any desired proportions desired may be utilized.

Strips 15 are nailed or otherwise secured to the inside of the top frame to permit a sheet of foraminous material such as metallic fabric to be secured thereto, and the frame is then finished by securing strips 16 around the frame over the edges of the fabric.

Strips 17 are secured around the lower edge of the lower frame interiorly thereof to form a support for a frame 18 designed to be placed in the said lower frame. The frame 18 is rectangular and of open construction and covered with a sheet of foraminous material 19. A layer of cloth, felt or any absorbent material may be rested upon the sheet of foraminous material 19 to afford a support for the food to be dried. Rods 20 may be provided beneath the frame 18 to support the covering thereof in the event it sags under the weight of the food.

In use, the frames 10 and 11 are opened and the food, which must be first comminuted is placed upon the layer of cloth or felt and the frames again closed. The container is then set out in the sun or in a dry, ventilated room. The food will then dry and will be retained in a cleanly condition, the entrance of dust or insects being precluded, the construction at the same time permitting the access of air to the food.

While I have illustrated and described my invention with some degree of particularity, I realize that in practice various alterations may be made therein. I therefore reserve the right and privilege of changing the form of the details of construction or otherwise altering the arrangement of the correlated parts, without departing from the spirit of the invention or the scope of the appended claims.

Having thus described my invention, what I claim as new and desire to secure by Letters Patent is:

1. An evaporator comprising hinged frames, a foraminous cover over one of the frames, strips on the inner side of the other frame adjacent its lower edge, a supplemental frame supported on said strips, a foraminous sheet secured to said supplemental frame and rods beneath said last mentioned foraminous sheet.

2. An evaporator comprising hinged frames, a foraminous cover, strips secured to one of said frames and supporting the foraminous cover, other strips secured to said frame and overlapping said foraminous cover, strips secured to the other frame and extending inwardly from the bottom edge of the frame, rods secured to certain of said strips, a frame supported by said strips, a foraminous sheet secured to said frame, and a fabric cover over said foraminous sheet.

3. An evaporator comprising hinged frames, a foraminous sheet secured to the edge of one frame, a supplemental frame within the other frame, a foraminous sheet secured to said frame and fabric cover over said foraminous sheet.

In testimony whereof I affix my signature in the presence of two witnesses.

JOHN C. SIEGLE.

Witnesses:
F. A. MONROE,
WALTER WINDLER.

Copies of this patent may be obtained for five cents each, by addressing the "Commissioner of Patents, Washington, D. C."